US006619764B2

(12) United States Patent
Sugamura

(10) Patent No.: US 6,619,764 B2
(45) Date of Patent: *Sep. 16, 2003

(54) TELEVISION CABINET

(75) Inventor: Tomokazu Sugamura, Osaka (JP)

(73) Assignee: Funai Electric Co., Ltd., Daito (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/155,476

(22) Filed: May 24, 2002

(65) Prior Publication Data

US 2002/0175602 A1 Nov. 28, 2002

(30) Foreign Application Priority Data

May 28, 2001 (JP) .............................. M.2001-003364 U

(51) Int. Cl.[7] ................................................ A47B 81/06
(52) U.S. Cl. ........................................................ 312/7.2
(58) Field of Search .............................. 312/7.2, 223.1, 312/223.2; 348/825, 836; 361/681, 682; 248/917, 918

(56) References Cited

U.S. PATENT DOCUMENTS 5,033,802 A * 7/1991 Fairbanks ............... 348/836 X
5,526,064 A * 6/1996 Okugawa et al. ........... 348/818
5,699,132 A * 12/1997 Adachi et al. ........... 312/7.2 X
5,956,101 A * 9/1999 Yang ........................ 312/7.2 X
5,999,233 A * 12/1999 Park ........................ 312/7.2 X
6,166,783 A * 12/2000 Ahn ........................ 312/7.2 X
6,233,026 B1 * 5/2001 Kim et al. .................. 348/836

FOREIGN PATENT DOCUMENTS

JP 2000-101952 * 4/2000
JP 3074025 9/2000

* cited by examiner

*Primary Examiner*—James O. Hansen
(74) *Attorney, Agent, or Firm*—Rosenthal & Osha L.L.P.

(57) ABSTRACT

The bosses 5 of a front cabinet are strengthened by the boss reinforcing rib 51, and the central part of the ceiling board 12 for the front cabinet 10 in the direction of the width is strengthened by the ceiling board reinforcing rib 61. The boss reinforcing rib 51 is formed with a high strength portion 52 of greater thickness, and a link portion 53 of the boss reinforcing rib 51 with the ceiling board 12 is molded in smaller thickness over the entire length than the high strength portion 52, thereby preventing the "sink" in molding from occurring. The strength of the boss reinforcing rib 51 itself is increased by making the boss reinforcing rib 51 gradually lower in height as being closer to the front end.

6 Claims, 7 Drawing Sheets

V
V
15
61
12
51
52
55
54
5
5a 12
56
51
53
VI
VI
52
5a
18

TELEVISION CABINET

BACKGROUND OF THE INVENTION

The present invention relates to a television cabinet, and more particularly to a television cabinet of a structure which is divided into a front cabinet and a rear cabinet.

In a television cabinet of this kind, for example, if a front cabinet and a rear cabinet are aligned with each other, a bore portion of a boss provided on the front cabinet is coincident with a vis insertion hole provided on the rear cabinet, and if an attaching vis inserted from the back side into the vis insertion hole of the rear cabinet is screwed into the bore portion of the boss for the front cabinet and fastened, the front cabinet and the rear cabinet can be joined integrally via the attaching vis. One example of the front cabinet in such television cabinet as described in the Granted Japanese Utility Mode No. 3074025 is shown in FIG. 7.

FIG. 7 is a front view of the front cabinet 10 for use in the television cabinet of video integral type, as seen from the back side, FIG. 8 is an enlarged front view of A portion of FIG. 7, FIG. 9 is a view of the A portion as seen from the direction of the arrow IX in FIG. 8, and FIG. 10 is a cross-sectional view of the A portion, taken along the line X—X in FIG. 9.

As seen from FIGS. 7 and 8, this front cabinet 10 is provided with a cylindrical boss 5 inside a ceiling board 12 of an outer board 11, an attaching vis being screwed into this boss 5. Reference numeral 13 denotes a cathode ray tube attaching boss, and reference numeral 14 denotes an opening in which a front face of the cathode ray tube is disposed. Also, a flexible strip 15 of U-character shape as seen from the front side is disposed inside the ceiling board 12. Thereby, when the cathode ray tube, not shown, is attached in the cathode ray tube attaching bosses 13, the cathode ray tube is prevented from directly abutting against the ceiling board 12. If the cathode ray tube is contacted with this flexible strip 15, the impact is relieved.

As shown in FIG. 9, the boss 5 is positioned at a rear end portion of the ceiling board 12, and the flexible strip 15 is positioned at a front end portion of the ceiling board 12. And the ceiling board 12 is provided with a platelike rib 17 extending lengthways, the flexible strip 15 being linked with a front end of the rib 17. On the contrary, a rear end portion of the rib 17 is positioned at a side portion spaced a certain distance from the boss 5. Also, the ceiling board 12 is linked with a plurality of platelike leg pieces 18, a certain one of the leg pieces 18 being linked via a lateral plate 19 to the boss 5, and the leg pieces 18 being linked to the rear end portion of the rib 17. These leg pieces 18 serve to support the bosses 5.

Further, the rib 17 has a high strength portion 21 of greater thickness extending lengthways, in which the high strength portion 21 is linked with an end portion of the boss 5 in a state with a certain clearance from the inner face of the ceiling board 12, and a link portion 22 of the rib 17 with the ceiling board 12 is formed in smaller thickness over the entire length than the high strength portion 21, as shown in FIGS. 9 and 10.

In this television cabinet, the front cabinet 10 is integrally moulded of synthetic resin. As seen from FIG. 7, the bosses 5, the flexible strips 15 and the ribs 17 are disposed symmetrically on both end portions of the ceiling board 12 extending in the direction of the width, and none of the bosses 5, the flexible strips 15 and the ribs 17 exist in the central part of the ceiling board 12.

In this front cabinet 10, the rib 17 serves as a ceiling board reinforcing rib to reinforce the ceiling board 12, or as a boss reinforcing rib to reinforce the boss 5. This rib 17 is formed at the substantially same height over its entire length.

In the conventional television cabinet as described above and shown in FIGS. 7 to 10, the ribs 17 are provided on both the left and right end portions of the ceiling board 12 for the front cabinet 10 in the direction of the width, and no ribs 17 exist in the central part of the ceiling board 12, whereby the central part of the ceiling board 12 has a weaker strength than both the left and right end portions of the ceiling board 12 in the direction of the width. To resolve this problem, the flexible strip and the rib linked with the flexible strip may be also formed in the central part of the ceiling board 12 in the direction of the width to strengthen the central part of the ceiling board 12. However, the bosses 5, the flexible strips 15 and the ribs 17 exist on both the left and right end portions of the ceiling board 12 in the direction of the width, and further the flexible strip and the rib are present in the central part of the ceiling board 12 in the direction of the width, whereby the front cabinet 10 becomes a complex structure, with increased mould manufacturing costs.

The flexible strip may be positioned in the central part of the ceiling board 12 in the direction of the width, and linked with the rib by omitting the flexible strips on both the left and right end portions of the ceiling board 12 in the direction of the width to suppress the number of flexible strips. Thus, the complex structure of the front cabinet 10 is somewhat avoided, and the ceiling board 12 is strengthened.

However, since the rib 17 for reinforcing the boss 5 is formed at the substantially same height over its entire length, as described above, the strength of the rib 17 itself is decreased if the flexible strip 17 linked with the rib 17 is omitted, resulting in a risk that the rib 17 is broken due to vibration during the transportation, an impact caused by the collision or stacking load, impairing the action of reinforcing the ceiling board 12. Though this problem can be resolved by increasing the thickness of the rib 17, a phenomenon called "sink" arises on the outer surface of the ceiling board 12, marring the appearance, when the rib 17 and the ceiling board 12 are integrally moulded, and in some cases, the front cabinet 10 itself may be judged as defective.

SUMMARY OF THE INVENTION

The present invention is achieved in the light of the aforementioned problems, and it is an object of the invention to provide a television cabinet wherein a flexible strip is positioned in the central part of a ceiling board in a direction of the width, and linked with a rib to reinforce the central part of the ceiling board in the direction of the width, and the bosses and the ribs for reinforcing the bosses are only disposed on the end portions of the ceiling board in the direction of the width by omitting the flexible strips from the end portions of the ceiling board in the direction of the width, whereby the complex structure of the cabinet is avoided without decreasing the strength of the ribs themselves for reinforcing the bosses, and there is no risk that the "sink" arises on the outer surface even by moulding the ceiling board.

A television cabinet of this invention comprises a front cabinet and a rear cabinet, wherein one of the front cabinet and the rear cabinet made of synthetic resin comprises a boss for screwing an attaching vis for joining the front cabinet and the rear cabinet, a platelike ceiling board reinforcing rib for reinforcing a ceiling board on one cabinet and a platelike boss reinforcing rib for reinforcing the boss and linked with the boss are moulded integrally on an inner face of the ceiling board in a longitudinally extending form, the boss reinforcing rib having a high strength portion of greater thickness extending lengthways, the high strength portion being spaced from the inner face of the ceiling board, and a link portion of the boss reinforcing rib with the ceiling board is formed in smaller thickness over its entire length than the high strength portion.

In this television cabinet, the ceiling board reinforcing rib serves to strengthen the ceiling board, and the boss reinforcing rib serves to strengthen the boss. And the high strength portion of greater thickness provided in the boss reinforcing rib serves not only to increase the strength of the boss reinforcing rib itself, but also to remarkably exhibit the reinforcing action of the boss with the boss reinforcing rib. Moreover, since the link portion of the ceiling board with the boss reinforcing rib is formed in smaller thickness than the high strength portion, the thickness of the link portion can be easily determined to the extent that the "sink" may not arise on the surface of the ceiling board without decreasing the strength of the boss reinforcing rib itself.

In this invention, the ceiling board reinforcing rib is disposed along a central part of the ceiling board in the direction of the width, and has a flexible strip linked with the ceiling board at an end portion thereof, and the boss reinforcing rib is disposed at an end portion of the ceiling board in the direction of the width. Thereby, it is possible to avoid a situation where the central part of the ceiling board in the direction of the width is not reinforced by the rib, whereby the central part of the ceiling board in the direction of the width is reinforced by the ceiling board reinforcing rib, and the boss is reinforced by the boss reinforcing rib.

Also, in this invention, one end of the boss reinforcing rib in a longitudinal direction and one end of the high strength portion in the longitudinal direction is continuous to a rear wall portion provided at an end portion of the boss in a lengthwise direction, the boss reinforcing rib being gradually lower in height as being farther away from the read wall portion, a top face of the boss reinforcing rib at the other end being smoothly continuous to the inner face of the ceiling board. Thereby, since one end of the boss reinforcing rib in the longitudinal direction and one end of the high strength portion in the longitudinal direction is continuous to the rear wall portion provided at the end portion of the boss in the lengthwise direction, the reinforcing action of the boss reinforcing rib is directly exerted on the boss 5, but not indirectly via the lateral plate 19, as shown in FIG. 8. Therefore, the boss can be effectively reinforced by the boss reinforcing rib. Moreover, since the boss reinforcing rib is gradually lower in height as being farther away from the read wall portion of the boss, and the top face of the boss reinforcing rib at the other end is smoothly continuous to the inner face of the ceiling board, the strength of the boss reinforcing rib itself is greater than when the boss reinforcing rib is formed at the substantially same height over the entire length, thereby increasing the reinforcing action of the ceiling board.

In this invention, a peripheral wall of the boss is linked directly with the top portion of a pair of left and right leg pieces that are integrally moulded with the ceiling board, and one of the pair of leg pieces is desirably linked longitudinally with the boss reinforcing rib.

Also, the size of thickness of the link portion of the boss reinforcing rib with the ceiling board over the entire length is desirably 0.6 times or less the size of thickness of the ceiling board. This is because if the size of thickness of the link portion over the entire length is 0.6 times or more the size of thickness of the ceiling board, the "sink" arises on the outer surface of the ceiling board, marring the appearance, when the ceiling board and the boss reinforcing rib are integrally moulded of synthetic resin such as polystyrene. On the other hand, if the size of thickness of the link portion over the entire length is 0.6 times or less the size of thickness of the ceiling board, the "sink" does not arise on the outer surface of the ceiling board not to mar the appearance.

In this invention, the size of spacing between the high strength portion of the boss reinforcing rib and the inner face of the ceiling board is desirably 2 mm or greater. This is because if this size of spacing is 2 mm or less, the thickness of a mould for moulding a clearance portion between the high strength portion and the inner face of the ceiling board is too small to manufacture the mould, and to release the mould from the clearance portion.

In this invention, a surface of the high strength portion of the boss reinforcing rib at one end in the longitudinal direction is desirably formed in a depressed curved face that is smoothly continuous to a rear wall face of the boss. Thereby, since a stress is less concentrated on an entry corner portion that is the link portion between the boss reinforcing rib and the rear end portion, a crack or fissure is less likely to arise at the entry corner portion.

According to this invention, there is provided a television cabinet divided into a front cabinet and a rear cabinet, wherein one of the front cabinet and the rear cabinet made of synthetic resin comprises a boss for screwing an attaching vis for joining the front cabinet and the rear cabinet, a platelike ceiling board reinforcing rib for reinforcing a ceiling board on one cabinet and a platelike boss reinforcing rib for reinforcing the boss and linked with the boss are moulded integrally on an inner face of the ceiling board in a longitudinally extending form, the boss reinforcing rib having a high strength portion of greater thickness extending lengthways, the high strength portion being spaced from the inner face of the ceiling board, and a link portion of the boss reinforcing rib with the ceiling board is formed in smaller thickness over its entire length than the high strength portion, characterized in that the ceiling board reinforcing rib is disposed along a central part of the ceiling board in a direction of the width, and has a flexible strip linked with the ceiling board at an end portion thereof, and the boss reinforcing rib is disposed at an end portion of the ceiling board in the direction of the width, one end of the boss reinforcing rib in a longitudinal direction and one end of the high strength portion in the longitudinal direction being continuous to a rear wall portion provided at an end portion of the boss in a lengthwise direction, a surface of the high strength portion at one end in the longitudinal direction being formed in a depressed curved face that is smoothly continuous to a rear wall face of the boss, the boss reinforcing rib being gradually lower in height as being farther away from the read wall portion, a top face of the boss reinforcing rib at the other end being smoothly continuous to the inner face of the ceiling board, wherein a peripheral wall of the boss is linked with a peripheral wall of a spare boss having the same shape as the boss, the peripheral wall of the boss and the peripheral wall of the spare boss being directly linked with a plurality of leg pieces disposed in the ceiling board, one of the plurality of leg pieces being linked with the boss reinforcing rib in the longitudinal direction, and wherein the size of thickness of the link portion of the boss reinforcing rib with the ceiling board over the entire length is 0.6 times or less the size of thickness of the ceiling board, and the size of spacing between the high strength portion of the boss reinforcing rib and the inner face of the ceiling board is 2 mm or greater.

DETAILED DESCRIPTION OF THE PREFERRED EMBODIMENTS

Figure 1:
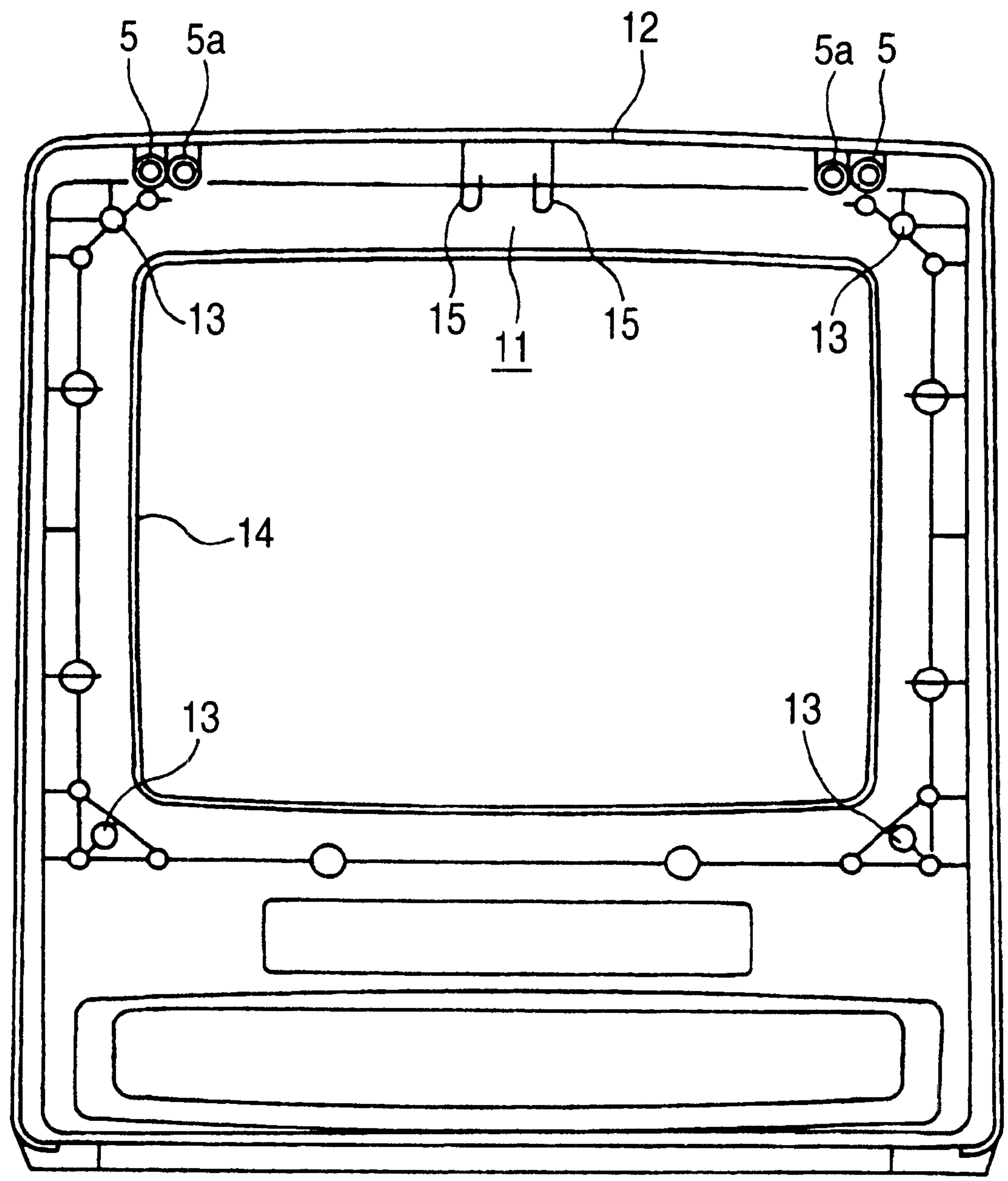
FIG. 1 is a front view of a front cabinet for use in a television cabinet of video integral type according to an embodiment of the present invention, as seen from the back side.
Figure 2:
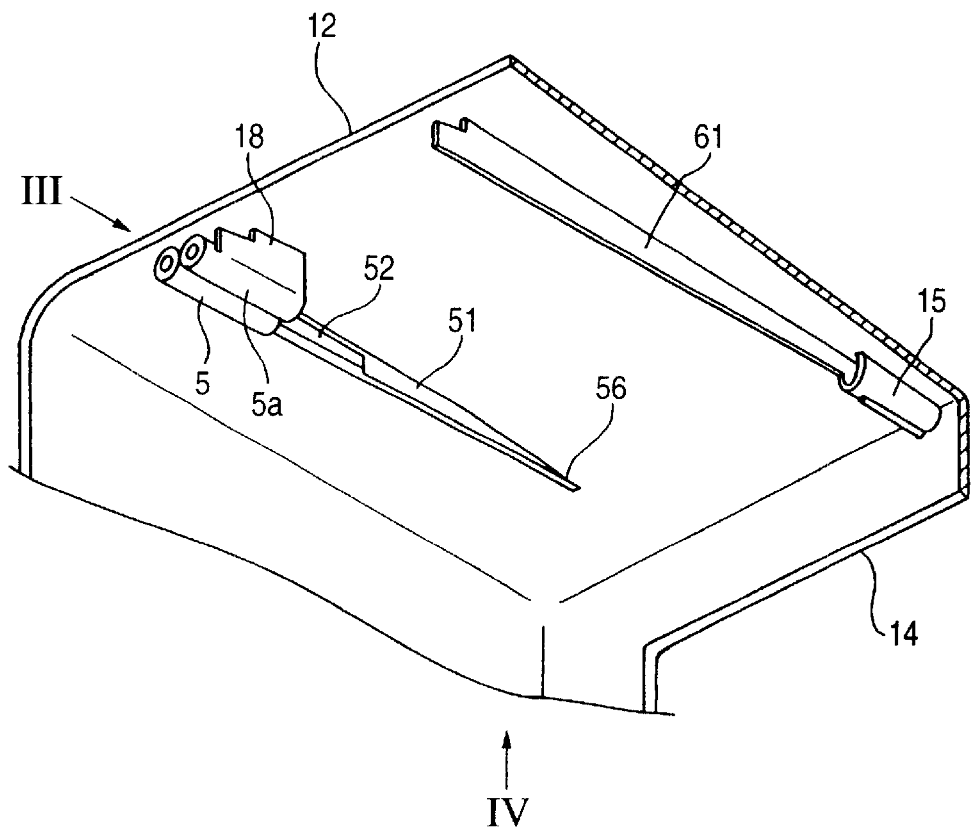
FIG. 2 is a schematic cross-sectional view of an essential portion of the television cabinet, as seen from the obliquely lower side.
Figure 3:
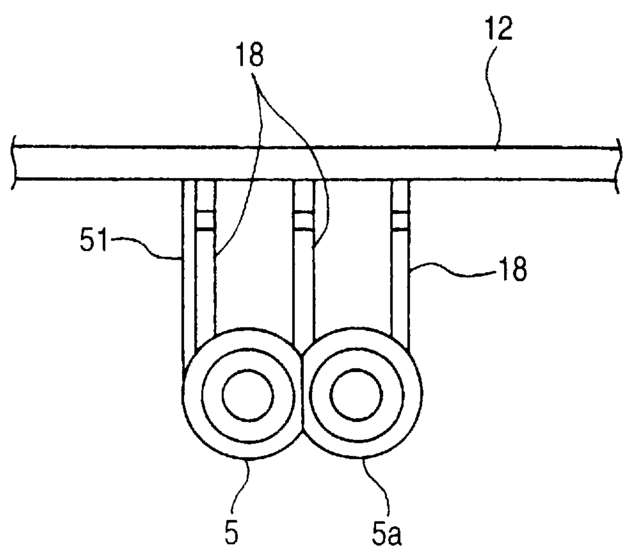
FIG. 3 is an enlarged view of the essential portion, as looked from the direction of the arrow III in FIG. 2.
Figure 4:
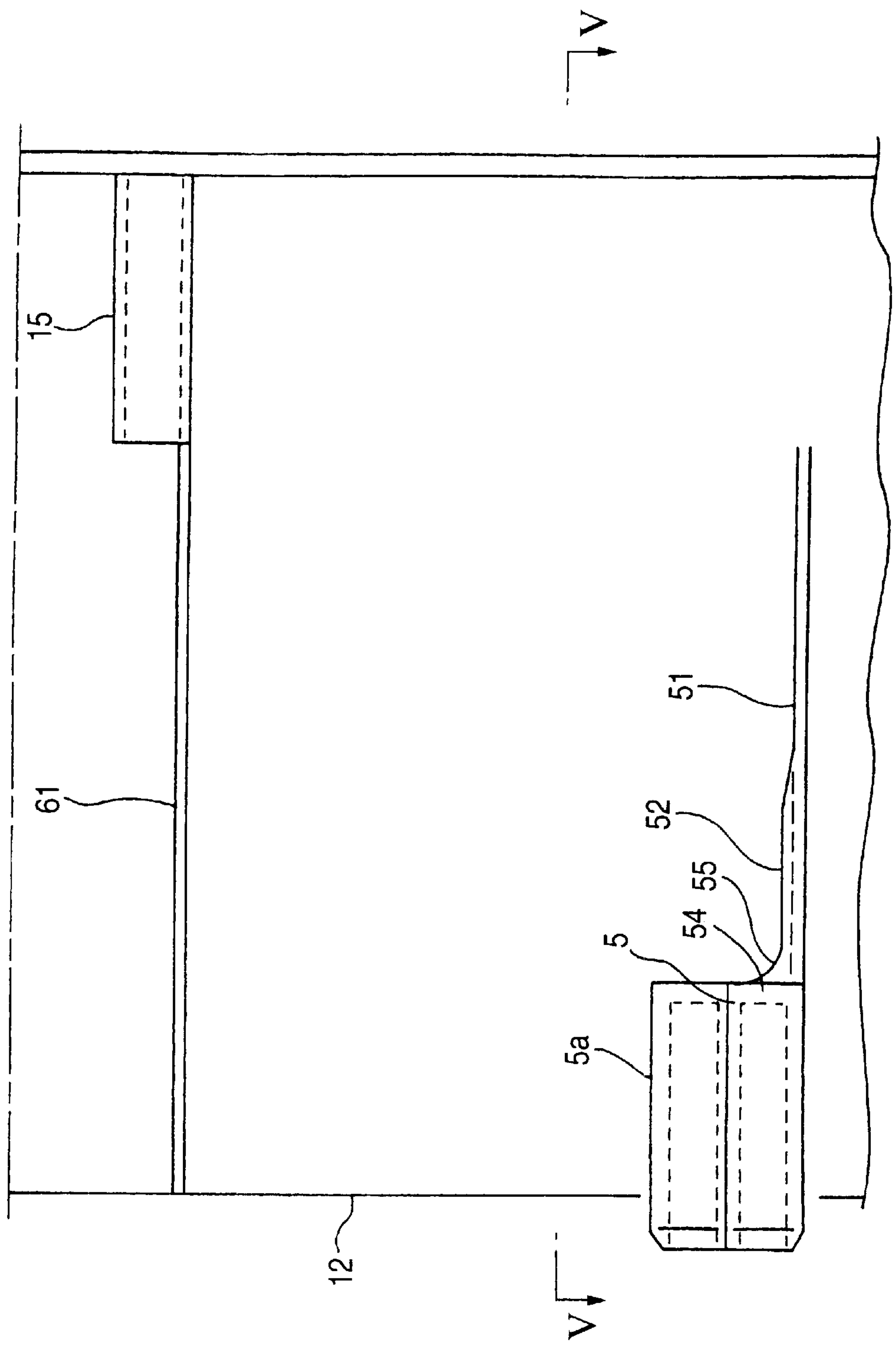
FIG. 4 is an enlarged view of the essential portion, as looked from the direction of the arrow IV in FIG. 2.
Figure 5:
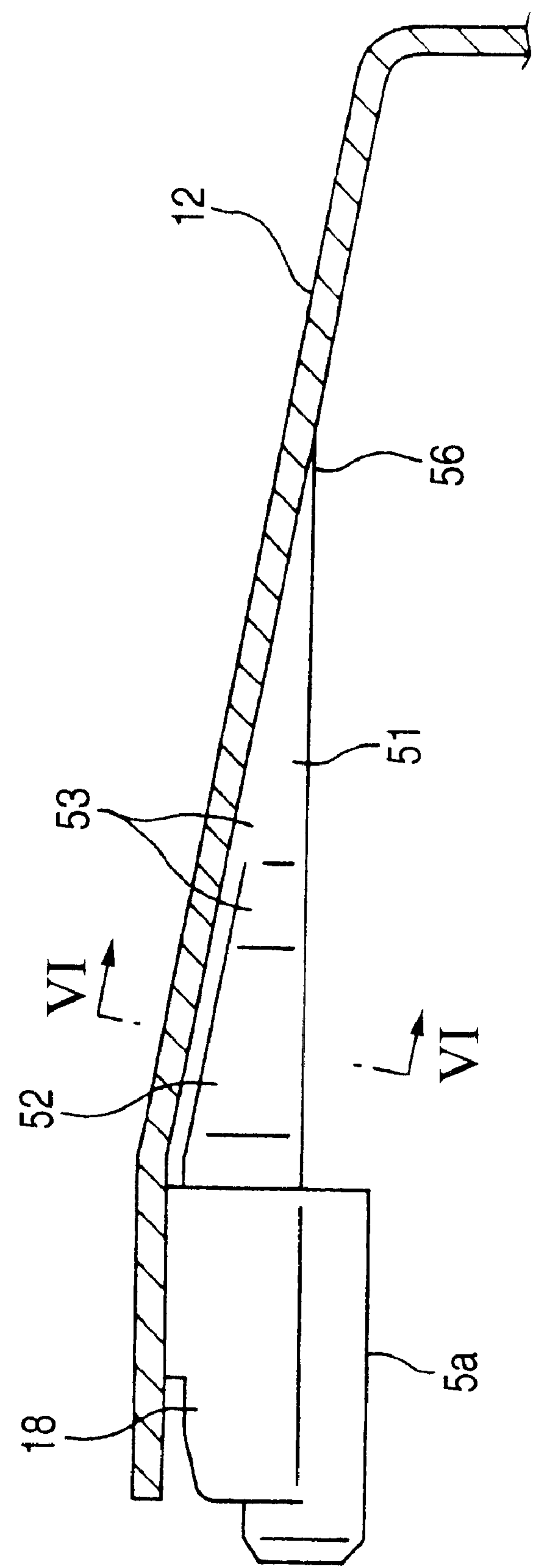
FIG. 5 is a cross-sectional view of FIG. 4, taken along the line V—V in FIG. 4.
Figure 6:
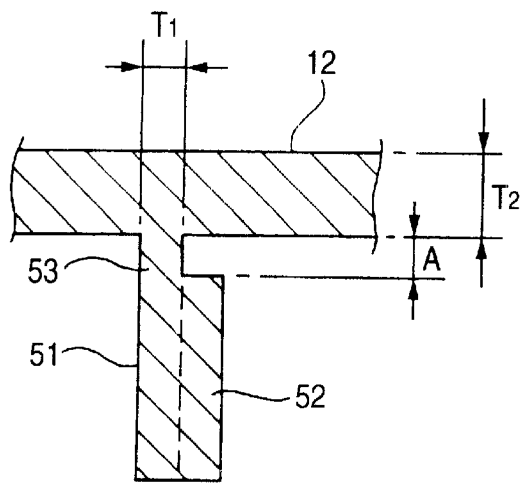
FIG. 6 is an enlarged cross-sectional view of FIG. 5, taken along the line VI—VI in FIG. 5.

FIG. 1 is a front view of a front cabinet 10, as seen from the back side, for use in a television cabinet of video integral type according to an embodiment of the invention. FIG. 2 is a schematic perspective view of the essence of the television cabinet, as seen from the obliquely lower side. FIG. 3 is an enlarged view of the essence of the television cabinet as seen from the direction of the arrow III in FIG. 2. FIG. 4 is an enlarged view of the essence of the television cabinet as seen from the direction of the arrow IV in FIG. 2. FIG. 5 is a cross-sectional view, taken along the line V—V in FIG. 4. FIG. 6 is an enlarged cross-sectional view, taken along the line VI—VI in FIG. 5.

Figure 7:
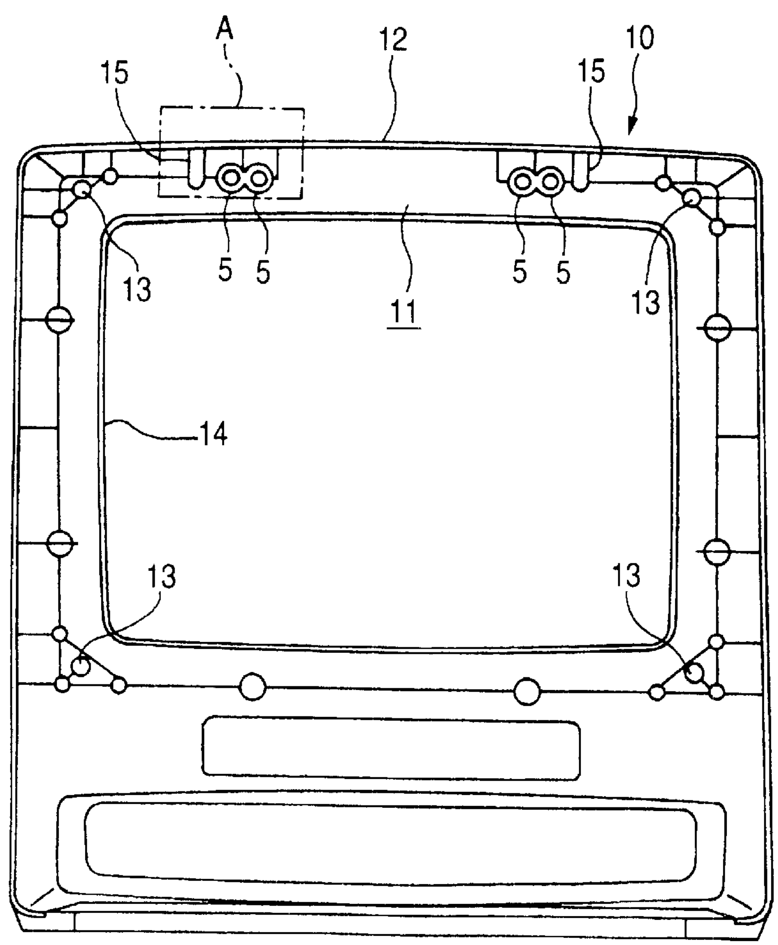
FIG. 7 is a front view of a front cabinet for use in the conventional television cabinet, as seen from the back side.

As shown in FIG. 1, this front cabinet 10 comprises the cylindrical bosses 5, flexible strips 15, cathode ray tube attaching bosses 13 that are provided inside a ceiling board 12 of an outer board having an opening 14 in which a front plane of the cathode ray tube is disposed in the same manner as described previously and shown in FIG. 7, but the bosses 5 and the flexible strips 15 are placed in different positional relation. The flexible strips 5 serve to prevent the cathode ray tube from abutting directly against the ceiling board 12, when the cathode ray tube is attached into the cathode ray tube attaching bosses 13, and also serve to relieve the impact, when the cathode ray tube abuts against the flexible strips.

As seen from FIG. 1, the bosses 5 are disposed on both the end portions of the ceiling board 12 in the direction of the width and at its rear side, while the flexible strips 15 are disposed in the central part of the ceiling board 12 in the direction of the width and at its front side.

As seen from FIGS. 2 to 5, a peripheral wall of the boss 5 is linked with a peripheral wall of a spare boss **5*a* having the same shape as the boss 5, the peripheral wall of the boss 5 and the peripheral wall of the spare boss 5*a* being linked directly with a plurality of (three in the figure) leg pieces 18 linked with the ceiling board 12. Also, one leg piece 18 linked with the peripheral wall of the boss 5 is linked with a front end of a platelike boss reinforcing rib 51 provided in a longitudinally extending form on the end portion of the ceiling board 12 in the direction of the width. This boss reinforcing rib 51 serves to hold securely the boss 5 and the spare boss 5*a* supported by the leg piece 18. This boss reinforcing rib 51 has a high strength portion 52 of greater thickness extending lengthways. As shown in FIGS. 5 and 6, the high strength portion 52 is spaced away from the inner face of the ceiling board 12. Also, a link portion 53 of the ceiling board 12 with the boss reinforcing rib 51 is formed in smaller thickness over its entire length than the high strength portion 52. Furthermore, one end (front end) of the boss reinforcing rib 51 in the longitudinal direction and one end (front end) of the high strength portion 52 in the longitudinal direction are continuous to a rear wall portion 54 provided at an end (rear end) of the boss 5 in the lengthwise direction, and the surface of the high strength portion 52 at one end portion in the longitudinal direction is formed on a depressed curved face 55 that is smoothly continuous to the rear wall portion of the boss 5. By doing so, the stress is less likely to concentrate on an entry corner portion that is a link portion between the boss reinforcing rib 51 and the rear wall face of the boss 5. Also, the boss reinforcing rib 51 is gradually lower in height at the position farther away from the rear wall portion 54 of the boss 5, the other end top face 56 of the boss reinforcing rib 5 being smoothly continuous to the inner face of the ceiling board 12, as seen in FIGS. 2 and 5**.

Figure 8:
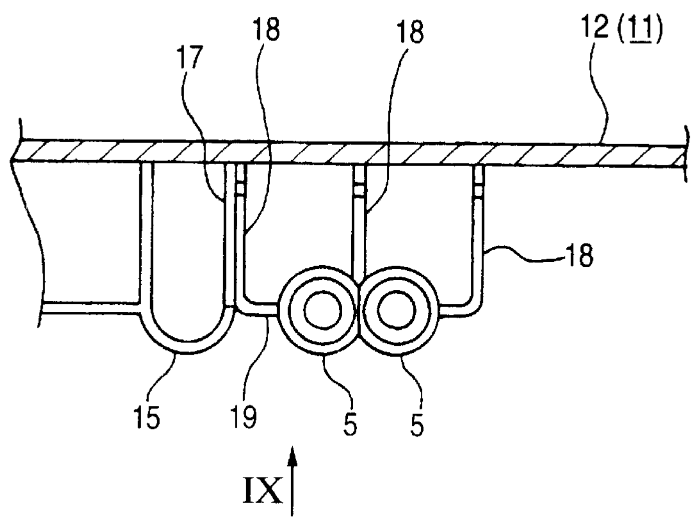
FIG. 8 is an enlarged front view of A portion of FIG. 7.
Figure 9:
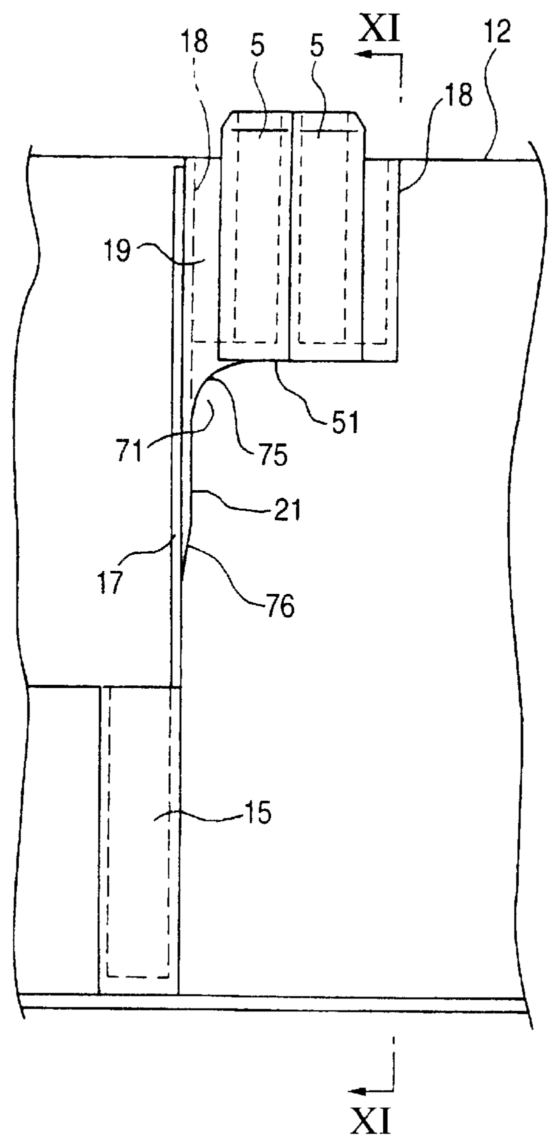
FIG. 9 is a view of FIG. 8, as looked from the direction of the arrow IX.
Figure 10:
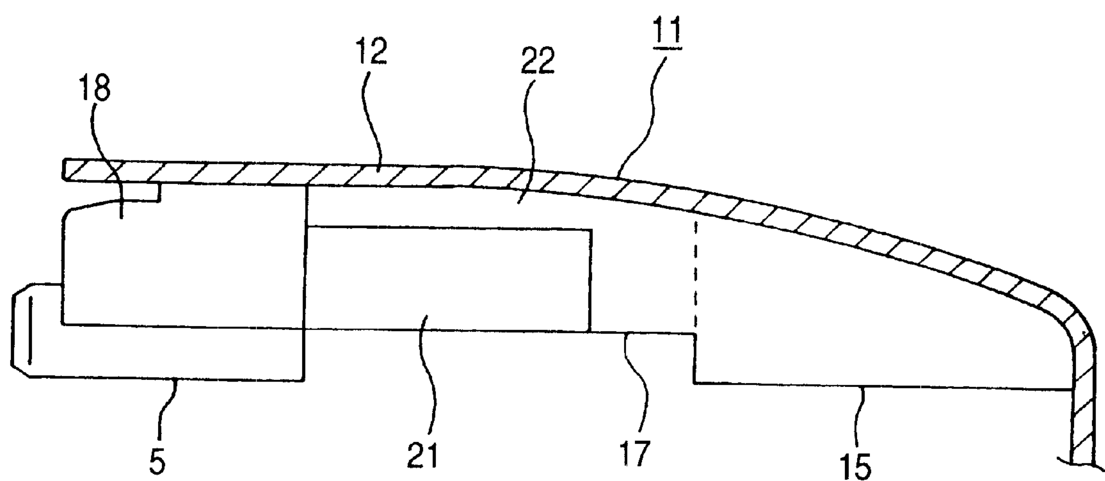
FIG. 10 is a cross-sectional view of FIG. 9, taken along the line X—X.

Since the boss reinforcing rib 51 is gradually lower in height as being closer to the front end, the rigidity (strength) of the boss reinforcing rib 51 itself is increased, thereby remarkably exhibiting the tightening action of the boss 5. In addition, since the front end of the boss reinforcing rib 51 and the front end of the high strength portion 52 are continuous to the rear wall portion at the rear end, the tightening action of the boss reinforcing rib 51 is directly exerted on the boss 5, but the tightening action of the rib 17 is not exerted indirectly via a transverse plate 19 on the boss 5, as shown in FIG. 8. Therefore, the boss 5 is effectively reinforced by the boss reinforcing rib 51. Furthermore, since the link portion 53 of the ceiling board 12 with the boss reinforcing rib 51 is formed in smaller thickness than the high strength portion 52, it is easily possible to avoid the "sink" in moulding on the outer surface of the ceiling board 12 by decreasing the thickness of the link portion 53. Even by doing so, because of the presence of the high strength portion 52, the strength of the boss reinforcing rib 51 or the tightening action of the boss 5 and the ceiling board 12 with the boss reinforcing rib 51 is not decreased.

Herein, the size of thickness T1 of the link portion 53 over its entire length as shown in FIG. 6 is desirably 0.6 times or less the size of thickness T2 of the ceiling board 12. If the size of thickness T1 of the link portion 53 over the entire length is greater than 0.6 times the size of thickness T2 of the ceiling board 12, the "sink" arises on the outer surface of the ceiling board 12 to impair the appearance, when the ceiling board 12 and the boss reinforcing rib 51 are integrally moulded of synthetic resin such as polystyrene. However, if the size of thickness T1 of the link portion 53 over the entire length is 0.6 times or less the size of thickness T2 of the ceiling board 12, the "sink" does not arise on the outer surface of the ceiling board 12 and impair the appearance. Specifically, if T2 is equal to 2 mm and T1 is equal to 1.2 mm, the "sink" does not arise on the outer surface of the ceiling board 12, and the strength of the link portion 53 can be obtained great enough to be satisfied. Further, the clearance size A between the high strength portion 52 and the inner face of the ceiling board 12 is desirably uniform as a whole. More specifically, it is desirably 2 mm or less uniformly. This is because if the clearance size A is shorter than 2 mm, the thickness of a mould for moulding a clearance portion between the high strength portion 52 and the inner face of the ceiling board 12 is too small to manufacture the mould, and to release the mould from the clearance portion.

As shown in FIGS. 2 and 4, the flexible strip 15 is linked to the front end of a ceiling board reinforcing rib 61 disposed in a form extending lengthways in the central part of the ceiling board 12 in the direction of the width. Accordingly, the ceiling board 12 is reinforced by the ceiling board reinforcing rib 61 in the central part thereof in the direction of the width. Moreover, when the cathode ray tube is attached, the collision between the cathode ray tube and the ceiling board 12 is prevented by the flexible strip 16, and when the cathode ray tube abuts against the flexible strip 15, the impact is absorbed by the flexure or deformation of the flexible strip 15.

As described above, with this embodiment of the invention, the ceiling board reinforcing rib 61 serves to reinforce the central part of the ceiling board 12 in the direction of the width. Therefore, a situation is relieved or resolved where the strength of the ceiling board 12 is smaller in the central part in the direction of the width than on both the left and right end portions of the ceiling board 12 in the direction of the width. Notwithstanding, since the boss 5 and the boss reinforcing rib 51 are only present at the end portion of the ceiling board 12 in the direction of the width, without flexible strip, the structure of the mould for moulding the front cabinet 10 is less complex than that of the mould for moulding the conventional front cabinet 10 as described previously and shown in FIG. 7.

As seen from FIG. 1, the bosses 5, the boss reinforcing ribs 51, the flexible strips 15, and the ceiling board reinforcing ribs 61 are disposed in symmetry in the ceiling board 12 of the front cabinet 10 integrally moulded of synthetic resin such as polystyrene.

In this embodiment, the invention is applied to the front cabinet, but may be also applied to a rear cabinet.

As described above, with this invention, since the ceiling board reinforcing rib and the boss reinforcing rib are disposed in the central part and on both the end portions of the ceiling board in the direction of the width, the central part of the ceiling board in the direction of the width does not have a weaker strength than the end portions of the ceiling board, whereby the complex structure of the cabinet is avoided and the manufacturing costs can be reduced. Nevertheless, the strength of the boss reinforcing rib itself is not decreased, and it is possible to provide the television cabinet in which the "sink" does not arise on the outer surface of the ceiling board by moulding. Thereby, it is possible to provide the television cabinet with excellent durability inexpensively.

What is claimed is:

1. A television cabinet comprising:

a front cabinet, and a rear cabinet, one of said front cabinet and said rear cabinet made of synthetic resin including a boss for screwing an attaching with a fastening screw for joining said front cabinet and said rear cabinet, a ceiling board reinforcing rib for reinforcing a ceiling board on one cabinet, and a boss reinforcing rib for reinforcing said boss and linked with said boss, said ceiling board reinforcing rib and said boss reinforcing rib being molded integrally on an inner face of said ceiling board in a longitudinally extending form, said boss reinforcing rib having a high strength portion of greater thickness extending lengthways, said high strength portion being spaced from the inner face of said ceiling board, and a link portion of said boss reinforcing rib with said ceiling board being formed in smaller thickness over an entire length thereof than said high strength portion, wherein said ceiling board reinforcing rib is disposed along a central part of said ceiling board in a direction of the width, and has a flexible strip linked with said ceiling board at an end portion thereof, said boss reinforcing rib is disposed at an end portion of said ceiling board in the direction of the width, one end of said boss reinforcing rib in a longitudinal direction and one end of said high strength portion in the longitudinal direction being continuous to a rear wall portion provided at an end portion of said boss in a lengthwise direction, a surface of said high strength portion at one end in the longitudinal direction being formed in a depressed curved face that is smoothly continuous to a rear wall face of said boss, said boss reinforcing rib being gradually lower in height as being farther away from said read wall portion, a top face of said boss reinforcing rib at the other end being smoothly continuous to the inner face of said ceiling board, a peripheral wall of said boss is linked with a peripheral wall of a spare boss having the same shape as said boss, said peripheral wall of said boss and said peripheral wall of said spare boss being directly linked with a plurality of leg pieces disposed in said ceiling board, one of the plurality of leg pieces being linked with said boss reinforcing rib in the longitudinal direction, and the size of thickness of said link portion of said boss reinforcing rib with said ceiling board over the entire length is 0.6 times or less the size of thickness of said ceiling board, and the size of spacing between the high strength portion of said boss reinforcing rib and the inner face of said ceiling board is 2 mm or greater.

2. A television cabinet comprising:

a front cabinet, and a rear cabinet, one of said front cabinet and said rear cabinet made of synthetic resin including a boss for screwing an attaching with a fastening screw for joining said front cabinet and said rear cabinet, a ceiling board reinforcing rib for reinforcing a ceiling board on one cabinet, and a boss reinforcing rib for reinforcing said boss and linked with said boss, said ceiling board reinforcing rib and said boss reinforcing rib being molded integrally on an inner face of said ceiling board in a longitudinally extending form, said boss reinforcing rib having a high strength portion of greater thickness extending lengthways, said high strength portion being spaced from the inner face of said ceiling board, and a link portion of said boss rib with said ceiling board being formed in smaller thickness over an entire length reinforcing thereof than said high strength portion, wherein said ceiling board reinforcing rib is disposed along a central part of said ceiling board in a direction of the width, and has a flexible strip linked with said ceiling board at an end portion thereof, and said boss reinforcing rib is disposed at an end portion of said ceiling board in the direction of the width, one end of said boss reinforcing rib in a longitudinal direction and one end of said high strength portion in the longitudinal direction being continuous to a rear wall portion provided at an end portion of said boss in a lengthwise direction, said boss reinforcing rib being gradually lower in height as being farther away from said read wall portion, a top face of said boss reinforcing rib at the other end being smoothly continuous to the inner face of said ceiling board.

3. The television cabinet according to claim 2, wherein a peripheral wall of said boss is directly linked with the top portion of a pair of left and right leg pieces integrally molded with said ceiling board, one of said pair of leg pieces being linked with said boss reinforcing rib in the longitudinal direction.

4. The television cabinet according to claim 2, wherein the size of thickness of said link portion of said boss reinforcing rib with said ceiling board over the entire length is 0.6 times or less the size of thickness of said ceiling board.

5. The television cabinet according to claim 2, wherein the size of spacing between the high strength portion of said boss reinforcing rib and the inner face of said ceiling board is 2 mm or greater.

6. The television cabinet according to claim 2, wherein the surface of said high strength portion of said boss reinforcing rib at one end in the longitudinal direction is formed in a depressed curved face that is smoothly continuous to the rear wall face of said boss.

* * * * *